F. G. SCOTT.
ICE CREAM FREEZER.
APPLICATION FILED JULY 25, 1918.

1,369,053.

Patented Feb. 22, 1921.

WITNESS
R. E. Rousseau.

INVENTOR
F. G. Scott,
BY
ATTORNEYS

UNITED STATES PATENT OFFICE.

FRANK GETTYS SCOTT, OF TULSA, OKLAHOMA.

ICE-CREAM FREEZER.

1,369,053.  Specification of Letters Patent.  Patented Feb. 22, 1921.

Application filed July 25, 1918. Serial No. 246,737.

*To all whom it may concern:*

Be it known that I, FRANK G. SCOTT, a citizen of the United States, and a resident of Tulsa, in the county of Tulsa and State of Oklahoma, have invented certain new and useful Improvements in Ice-Cream Freezers, of which the following is a specification.

My invention is an improvement in ice cream freezers, and has for its object to provide a freezer wherein the stirring paddle is of the oscillating type and wherein means is provided in connection with the paddle for thoroughly stirring the mixture during the operation of freezing, especially that part adjacent to the wall of the container.

In the drawings:—

In the present embodiment of the invention a suitable container 1 is provided for the mixture, the said container being metal and having a cap or cover 2. This container is arranged within a wooden receptacle 3, and the container has a bar 4 extending diametrically of the bottom thereof and secured to the bottom in any suitable or desired manner, the ends of the bar extending beyond the container a short distance.

Figure 1:
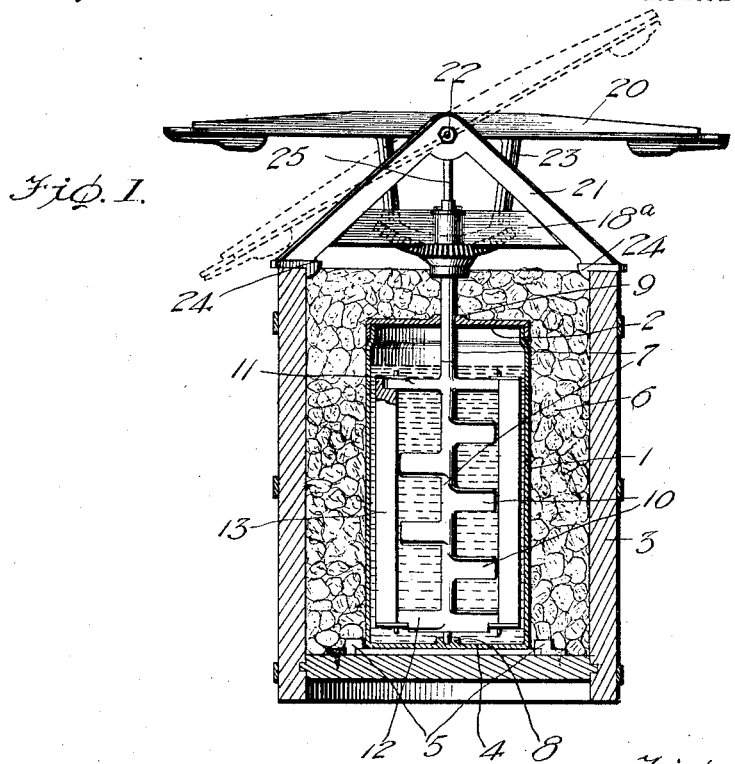
Figure 1 is a vertical section through the improved freezer.

Each end of the bar engages an anchor 5, each of which consists of a plate having openings for receiving screws or the like to secure the anchor to the bottom of the receptacle 3, and a pair of lugs extends laterally from one edge of the plate in spaced relation. The ends of the bar engage between these lugs, as shown in Fig. 1, to anchor the container to the receptacle to prevent turning thereof during the making of the ice cream.

The usual cracked ice and salt, indicated at 6, is packed between the container and the receptacle wall, and a shaft 7 is journaled at the center of the container 1, the said shaft engaging a bearing 8 in the bottom of the container and a bearing 9 in the cover. A plurality of series of blades extends radially from the shaft in opposite directions, and it will be noted that the said blades are inclined with respect to the shaft, all the blades of each series inclining in the same direction and in the opposite direction to the blades of the other series.

The shaft has cross heads 11 and 12 at its ends, the blades 10 being between the cross heads and to each of these cross heads is connected a stirring blade or bar 13, the said blades having their side walls converging toward the shaft as shown.

Figure 3:
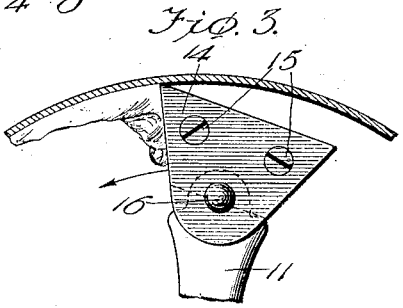
Figs. 3 and 4 are details showing the mechanism for stirring that portion of the mixture adjacent to the wall.
Figure 4:
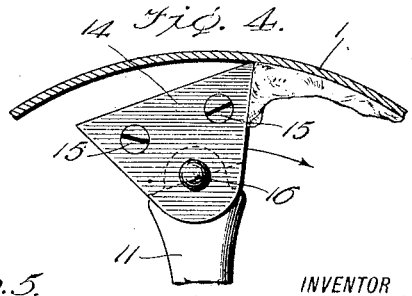
Figure 5:
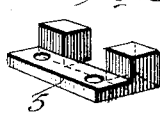
Fig. 5 is a perspective view of one of the anchors for the container.

A plate 14 of substantially triangular form is secured to each end of each bar, by means of screws 15 or the like, and these plates lap upon the cross heads at their ends and engage pins 16 on the cross heads. Thus each stirring blade is pivotally connected to the cross heads in such manner that it may be swung in the manner indicated in Figs. 3 and 4, to bring the angular edges between the inclined faces and the wide face of the bar into contact with the interior of the container to scrape the partially frozen cream from the container walls to thoroughly mix the cream in the container.

Figure 2:
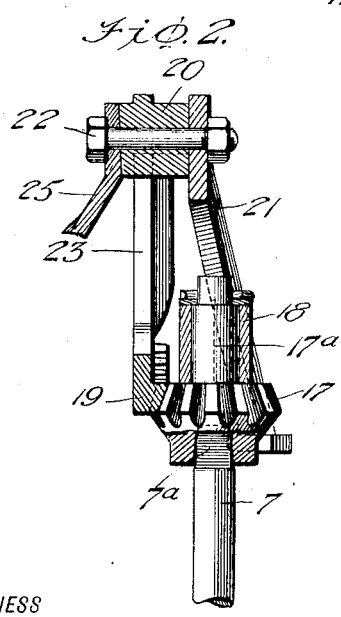
Fig. 2 is a section at right angles to Fig. 1 through the operating mechanism.

A bevel pinion 17 is arranged on the reduced polygonal upper end of the shaft 7, as shown more particularly in Fig. 2, and it will be noted that the polygonal portion 7ª of the shaft is tapering as is also the opening through the hub of the pinion, and the pinion fits loosely on the shaft. The pinion has an axial shaft 17ª which passes upwardly through a bearing 18 supported in a manner to be presently described, and the pinion is held in place by a cross pin and a washer as shown.

This bearing 18 is in a cross plate 18ª which connects the arms of a substantially V-shaped bracket 21. This bracket has at the ends of its arms clips 24 for engaging the edges of the receptacle, and an oscillating lever 20 is pivoted to the bracket at the junction of the arm by means of a bolt and nut 22 as shown. This lever carries a toothed segment 19, which is connected to the lever by arms 23, and the segment engages a pinion 17, the said pinion being a bevel pinion as shown. An arm 25 extends from the apex of the bracket 21, inclining downwardly and outwardly in a plane substantially perpendicular to the plane of the bracket to engage the upper edge of the receptacle, the said arm having clips 24 for engaging the edge of the receptacle. Thus the V-shaped bracket and the arm 25 form a tripod for supporting the oscillating lever.

In operation, the lever 20 is oscillated, and through its oscillation the shaft 7 will be oscillated in opposite directions, the rapidity of the operation depending upon the rapidity of the movement of the lever. The arrangement is such that each oscillation of the shaft is substantially a complete rotation, and thus the stirring bars will be slipped entirely around the interior of the container to thoroughly mix and stir the contents thereof.

I claim:—

In an ice cream freezer, a container, a shaft journaled at the axis of the container and having at each end a cross head, and scraper bars arranged approximately parallel with the shaft and pivoted to the ends of the cross head, said bars having beveled side edges to form scraping edges at the side edges of the faces remote from the shaft, the shaft having radial stirring blades extending toward the bars, said bars being imperforate between the scraping edges.

FRANK GETTYS SCOTT.

Witnesses:
J. W. GUILFOYLE,
JOHN WILSON.